United States Patent
Legathe

(10) Patent No.: US 8,347,771 B2
(45) Date of Patent: Jan. 8, 2013

(54) PROCESS FOR LOCALIZATION OF A LONG-MEMBER PROFILE THAT IS INSERTED BETWEEN FIBROUS SUPPORT PREFORMS THAT ARE ASSEMBLED FOR FORMING A COMPOSITE-MATERIAL PART

(75) Inventor: Olivier Legathe, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 390 days.

(21) Appl. No.: 12/626,172

(22) Filed: Nov. 25, 2009

(65) Prior Publication Data

US 2010/0126333 A1    May 27, 2010

(30) Foreign Application Priority Data

Nov. 25, 2008  (FR) ...................................... 08 57992

(51) Int. Cl.
*D04C 1/02*    (2006.01)
(52) U.S. Cl. ............................................................. 87/5
(58) Field of Classification Search ........... 87/5; 57/200
See application file for complete search history.

(56) References Cited

U.S. PATENT DOCUMENTS

| | | | | |
|---|---|---|---|---|
| 6,293,081 B1* | 9/2001 | Grulick et al. | ................... | 57/293 |
| 6,755,226 B2* | 6/2004 | Miyazaki et al. | ............. | 152/451 |
| 6,952,915 B2* | 10/2005 | Prickett | ........................... | 57/211 |
| 7,117,981 B2* | 10/2006 | Logan et al. | ................... | 187/391 |
| 7,127,879 B2* | 10/2006 | Zhu et al. | ......................... | 57/236 |
| 7,516,605 B2* | 4/2009 | Goldwater et al. | ............. | 57/238 |
| 7,752,830 B2* | 7/2010 | Goldwater et al. | ............. | 57/238 |
| 2004/0065072 A1* | 4/2004 | Zhu et al. | ......................... | 57/314 |
| 2005/0091961 A1* | 5/2005 | Prickett | ........................... | 57/238 |
| 2005/0231207 A1* | 10/2005 | Goldwater et al. | .......... | 324/522 |
| 2007/0062173 A1* | 3/2007 | Hummel | ......................... | 57/210 |
| 2007/0289686 A1* | 12/2007 | Sasabe et al. | ................. | 152/539 |
| 2008/0191682 A1* | 8/2008 | Cook | ............................. | 324/67 |

FOREIGN PATENT DOCUMENTS

| | | |
|---|---|---|
| DE | 102006031432 | 1/2008 |
| EP | 0841580 | 5/1998 |

OTHER PUBLICATIONS

International Search Report dated Jun. 2, 2009, in French patent application.
F.C. Campbell, "Manufacturing processes for advanced composites", 2004, pp. 474-483, Elsevier, XP-002529979.

* cited by examiner

*Primary Examiner* — Shaun R Hurley
(74) *Attorney, Agent, or Firm* — Young & Thompson

(57) ABSTRACT

An assembly of fibrous support preforms that makes it possible to obtain a composite-material part that includes a space (30) that originates from the assembly in which a long-member profile (32) of organic or inorganic fibers is housed and whose purpose is to fill the space (30), is characterized in that the long-member profile includes at least one metal fiber that extends over the entire length of the profile (32) so as to ensure the function of a marker that can be detected by detection element (38) that emit waves that can be modified by the marker (36).

7 Claims, 2 Drawing Sheets

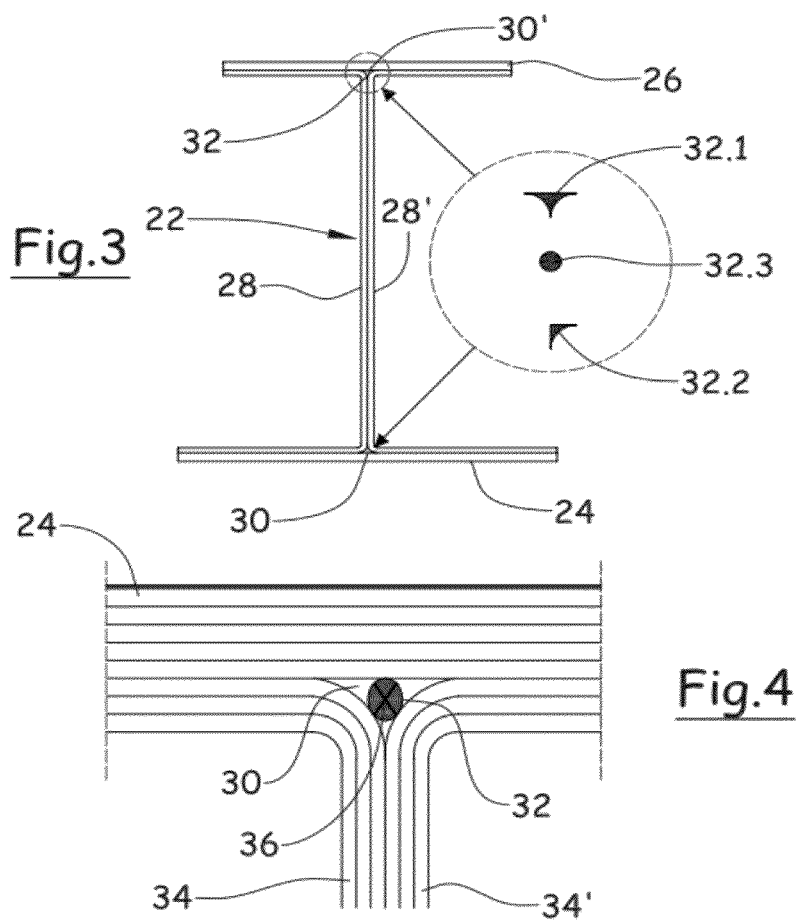
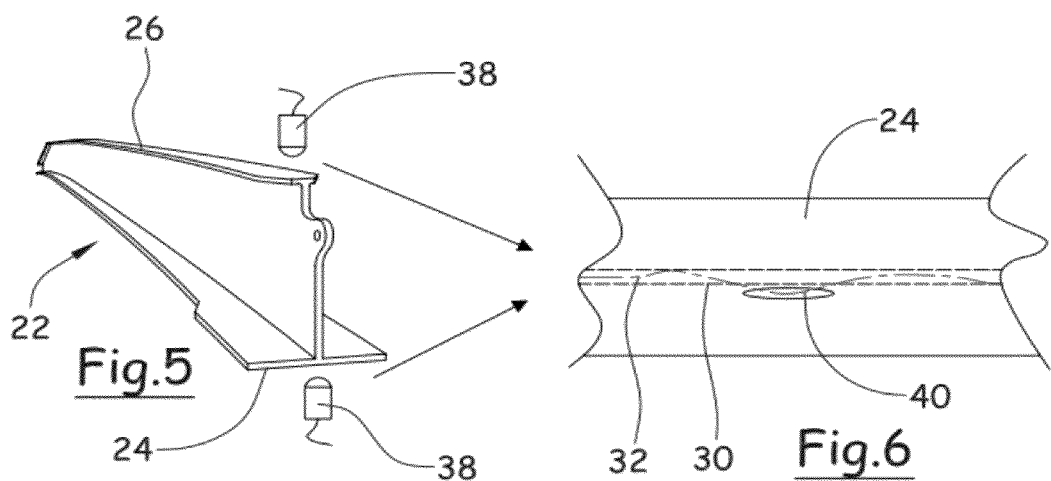

PROCESS FOR LOCALIZATION OF A LONG-MEMBER PROFILE THAT IS INSERTED BETWEEN FIBROUS SUPPORT PREFORMS THAT ARE ASSEMBLED FOR FORMING A COMPOSITE-MATERIAL PART

This invention relates to a process for localization of a long-member profile that is inserted between fibrous support preforms that are assembled for forming a composite-material part. The invention also relates to a long-member profile that makes said localization possible.

Certain composite-material parts are made from assembled fibrous support preforms and then are placed in a mold so as to be immersed in a resin matrix.

Figure 1:
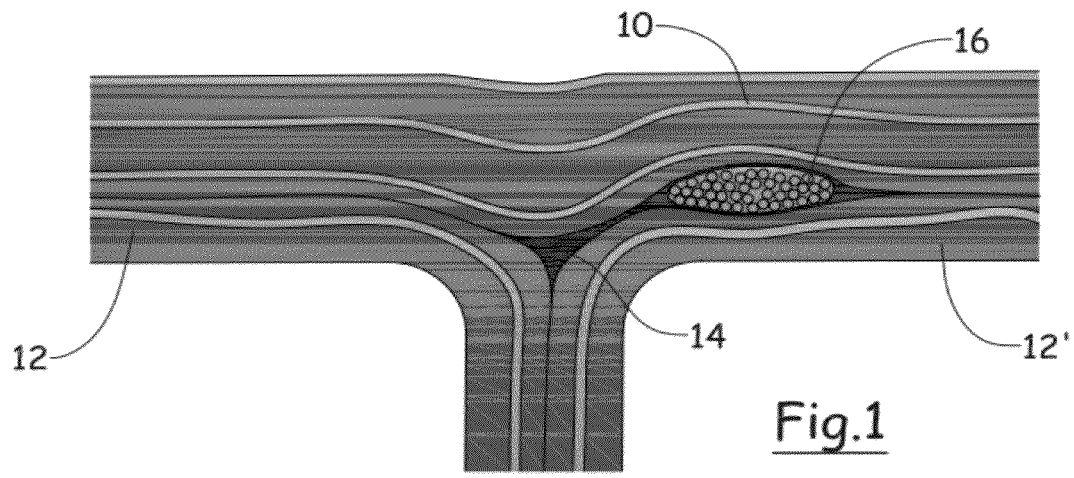

To obtain a T shape, according to a first embodiment that is illustrated in FIG. 1, three preforms are assembled, a first preform 10 that is called an essentially flat base, and then two other L-shaped preforms 12, 12' that are arranged symmetrically, each of the L-shaped preforms having a first wing that is flattened against a wing of the other L-shaped preform, and a second wing that is flattened against the base 10. At the junction of the wings, the L-shaped preforms 12, 12' have a radius of curvature that is more or less large; at the level of the junction of the three preforms, a space 14 is left that has a section that is shaped like a nail head. In this case, this space 14 has a section with a flat face and two concave and curved faces.

To ensure satisfactory mechanical characteristics, the space 14 is to be filled with fibrous supports.

According to one embodiment, an operator makes strands of pre-impregnated carbon fibers so as to obtain a long-member profile 16 with a circular section. He then positions the long-member profile 16 in the space 14 with the help of, for example, an adhesive strip, and then he heats it with a flat iron so that said long-member profile 16 becomes integral with the other preforms.

Even if this operation is carried out with a lot of attention to detail, it may happen that the long-member profile 16 exits at certain locations from the space 14 and comes to be inserted between the preforms 10, 12' or 12 as illustrated in FIG. 1.

The movement of the nail head can also take place when it is desired to adjust the length of the preform so that the latter is adapted to the mold, for example by using a sharp-edged tool.

This poor positioning of the long-member profile 16 is difficult to detect once the preforms are assembled. This defect can be detected only through a visual monitoring of the ends of the preforms. This type of monitoring is not satisfactory because it does not make it possible to monitor the positioning of the long-member profile over its entire length. However, a localized positioning defect of the long-member profile between the ends leads to localized defects of the part that greatly alter the mechanical characteristics of the part that is obtained. Thus, the cavities that are not filled by the profile promote the appearance of preferred resin paths that disrupt the filling of the mold and consequently increase the risks of greatly porous zones and/or dry zones. In addition, the surrounding parts of the poorly-positioned portion of the long-member profile 16 are deformed during the assembly of the preforms or during the closing of the mold, which affects the mechanical characteristics of the part that is thus produced due to the undulations of the fibers.

Also, the purpose of this invention is to propose a process for localization of a long-member profile of fibers that is inserted between the assembled fibrous support preforms for forming a composite-material part, whereby said process makes it possible to detect possible defects that arise from the poor positioning of at least one portion of said profile that can alter the mechanical properties of said part.

For this purpose, the invention has as its object a process for localization of a long-member profile of fibers that is provided to be housed in a space that originates from the assembly of fibrous support preforms, whereby said fibrous support preform assembly makes it possible to obtain a composite-material part, and whereby said long-member profile of fibers comprises support fibers, characterized in that it consists in placing—in the long-member profile of fibers—a marker that extends over the length of said profile and in moving—to the outside of the preforms—detection means that emit waves that can be modified by said marker.

Figure 2:
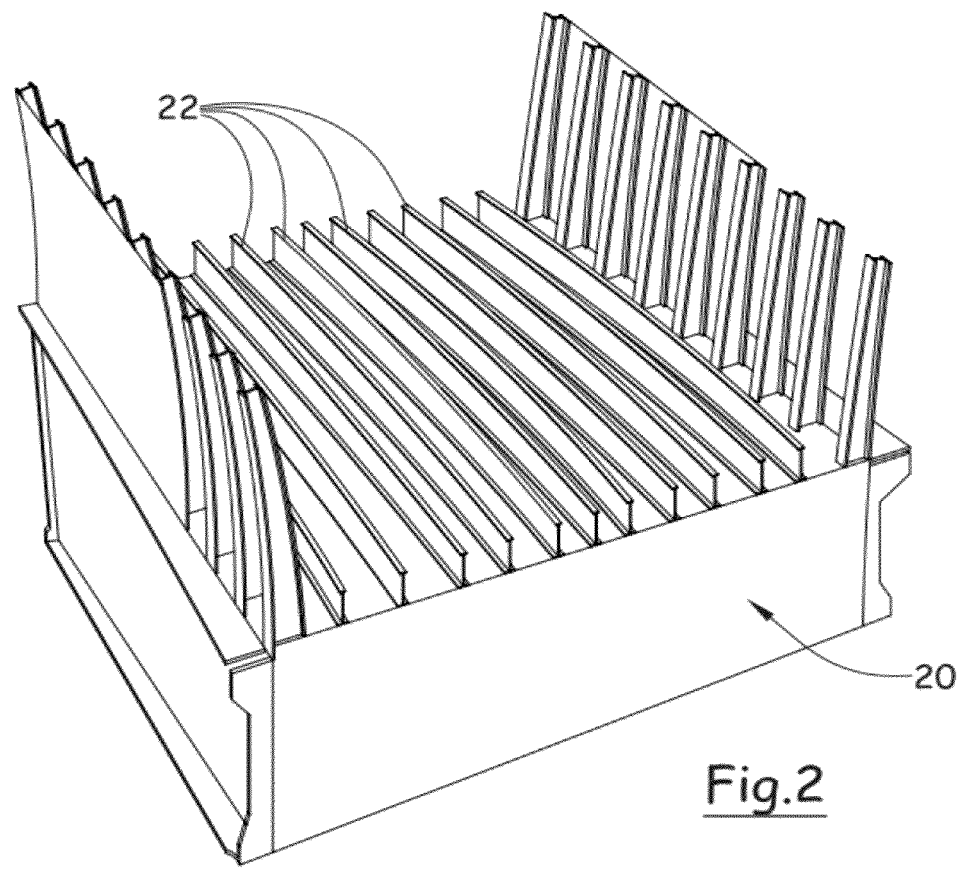

Other characteristics and advantages will emerge from the following description of the invention, a description that is provided only by way of example, with regard to the accompanying drawings in which:

FIG. 1 is a transversal cutaway that illustrates in detail a positioning defect of a portion of a long-member profile, FIG. 2 is a perspective view of a fuselage segment of an aircraft that comprises stiffeners, FIG. 3 is a transversal cutaway of a stiffener according to a variant embodiment and different variants of long-member profile sections, FIG. 4 is a transversal cutaway that illustrates the assembly of preforms that integrate a long-member profile according to the invention that comprises a marker, FIG. 5 is a perspective view of a stiffener that is subjected to a localization process according to the invention, and FIG. 6 is a bottom view of the stiffener of FIG. 5 that shows the position of the long-member profile and a poor positioning of at least one portion of said long-member profile.

In FIG. 2, a box of an aircraft fuselage that comprises stiffeners 22 that are also called girders is shown at 20.

According to one embodiment, the stiffeners 22 can be made of composite material from preforms of assembled fibrous supports and then arranged in a mold so as to be immersed in a resin matrix.

According to one embodiment, the preforms comprise a stack of fiber folds so as to form plates, whereby some are flexible enough to be deformed so as to form an L-shaped or U-shaped profile, for example.

For the remainder of the description, longitudinal direction is defined as the direction that corresponds to the largest dimension of the stiffener. Transverse plane is defined as a plane that is perpendicular to the longitudinal direction.

FIG. 3 shows a variant of a stiffener 22 with an I-shaped section in a transverse plane, extending in the longitudinal direction.

This stiffener 22 is obtained by assembling four fibrous support preforms, a first preform 24 that is called an essentially flat base, a second preform 26 that is called a stub that is essentially flat and preferably parallel to the first preform, as well as two U-shaped preforms 28, 28' that are arranged symmetrically, whereby each preform 28 or 28' comprises a first wing that is flattened against the base 24, a second wing that is flattened against the stub 26, and the U-shaped preform bases that are flattened against one another.

Because of the radii of curvature that are present at the junction zones between the wings and the base of the preforms 28 and 28', a space 30, or 30' is left—in each of which is arranged a long-member profile of fibers 32—on the one hand at the junction zone between the base 24 and the two U-shaped preforms 28, 28' and on the other hand at the junction zone between the stub 26 and the two U-shaped preforms 28, 28'.

This profile extends over the entire length of the stiffener and preferably has shapes that are adapted to those of the space 30.

According to the assembly types, the space can have a section in the shape of a nail head 32.1 or in the shape of a half nail head 32.2 (depicted in FIG. 3) in a transverse plane.

According to one embodiment, this long-member profile has a circular section as referenced at 32.3 in FIG. 3 and comprises fibers or cores (several fibers) that are plaited, braided, or stranded. By way of example, the fibers are support fibers that are made of organic or inorganic material, for example carbon.

However, the invention is not limited to this embodiment of the profile and to this type of material. This long-member profile 32 comprises fibers that extend over the entire length of the profile and that are arranged so as to form a profile according to a desired section. To ensure a certain cohesion between the fibers, the latter can be impregnated with a resin that is activated during or after the shaping of the profile.

FIG. 4 shows a T-shaped assembly of preforms with a base 24 and two L-shaped preforms 34, 34', delimiting at their junction zone a space 30 with a section in the shape of a nail head in which a long-member profile of fibers 32 is placed.

According to the invention, the long-member profile of fibers 32 comprises a marker 36 that extends over the length of said profile and that can be detected by non-destructive detection means 38, whereby said marker modifies the waves that are emitted by said detection means 38. Preferably, the detection is of the ultrasonic type. In this case, the signal that is received by the detection means 38 makes it possible to localize the long-member profile of fibers.

Preferably, an ultrasonic signal whose frequency is selected between 5 and 10 MHz is used.

As appropriate, the marker can extend over the entire length of the profile continuously or intermittently in segments that are spaced from one another.

Advantageously, the long-member profile of fibers 32 comprises at least one metal fiber that extends over the entire length of said profile ensuring the function of marker 36. To ensure correct detection, the long-member profile of fibers 32 comprises approximately 20% metal fibers.

Preferably, the marker 36 comprises at least one bronze fiber, whereby this material is compatible with carbon for the corrosion aspects.

The addition of this marker modifies the manufacturing range of long-member profiles 32 only to a small extent. Actually, in the case of a profile 32 that is obtained by braiding fibers, it is suitable to add metal fibers to the carbon fibers before braiding them.

As illustrated in FIG. 5, the process makes it possible to localize the long-member profile by moving an ultrasonic sensor 38 along the part to be monitored, outside of the preforms, in the longitudinal direction. To verify the positioning of the long-member profile that is flattened against the base, it is suitable to move the ultrasonic sensor 38 close to the surface of the base opposite to the one against which said profile is flattened. In the same way, to verify the positioning of the long-member profile that is flattened against the stub, it is suitable to move the ultrasonic sensor 38 close to the surface of the stub that is opposite to the one against which said profile is flattened.

FIG. 6 shows a space 30 that is delimited by two parallel dotted lines in which a long-member profile of fibers 32 is to be placed theoretically. The position of the long-member profile of fibers 32 that is detected by the ultrasonic sensor 38 is shown in broken lines. According to the example that is illustrated in this figure, a portion 40 of the long-member profile is arranged outside of the space 30. This poor positioning affects the mechanical characteristics of the composite-material part that is thus obtained.

The invention makes it possible to detect in a reliable manner a defect that is linked to the poor positioning of the long-member profile of fibers over the entire length of the part.

Although described as applied to stiffeners that are mounted on a box of an aircraft fuselage, the invention is not limited to this field and can be applied to all of the composite-material parts that are obtained by assembling fibrous support preforms that form between them a space that is filled in by a long-member profile of fibers.

The invention claimed is:

1. Assembly of fibrous support preforms that makes it possible to obtain a composite-material part that comprises a space (30) that originates from said assembly in which a long-member profile (32) of organic or inorganic fibers is housed and whose purpose is to fill said space (30), characterized in that the long-member profile comprises approximately 20% metal fibers that extend over the entire length of said profile (32) so as to ensure the function of a marker that can be detected by detection means (38) that emit waves that can be modified by said marker (36).

2. Assembly of fibrous support preforms according to claim 1, wherein the long-member profile comprises support fibers and the approximately 20% metal fibers are plaited, braided, or stranded.

3. Assembly of fibrous support preforms according to claim 1, wherein the long-member profile comprises approximately 20% bronze fibers that extend over the entire length of said profile.

4. Process for localization of a long-member profile of fibers (32) that is provided to be housed in a space (30) that originates from the assembly of fibrous support preforms, whereby said assembly of fibrous support preforms makes it possible to obtain a composite-material part, and whereby said long-member profile of fibers (32) comprises support fibers, wherein the long-member profile of fibers (32) comprises approximately 20% metal fibers (36) that extend over the length of the long-member profile of fibers (32) and in moving—to the outside of the preforms—detection means (38) that emit waves that can be modified by said metal fibers (36).

5. Process for localization of a long-member profile of fibers according to claim 4, wherein the long-member profile of fibers (32) comprises approximately 20% bronze fibers that extend over the entire length of said profile.

6. Process for localization of a long-member profile of fibers according to claim 4, comprising using an ultrasonic sensor (38) for localizing said profile.

7. Process for localization of a long-member profile of fibers according to claim 6, wherein the signal that is emitted by the ultrasonic sensor (38) has a frequency that varies from 5 to 10 MHz.

\* \* \* \* \*